United States Patent [19]

Shelton

[11] Patent Number: 4,532,577

[45] Date of Patent: Jul. 30, 1985

[54] ADJUSTABLE SEATING ARRANGEMENT FOR A TAIL LAMP ASSEMBLY

[75] Inventor: Allan J. Shelton, Auburn Heights, Mich.

[73] Assignee: General Motors Corporation, Detroit, Mich.

[21] Appl. No.: 641,846

[22] Filed: Aug. 17, 1984

[51] Int. Cl.³ .............................................. B60Q 1/44
[52] U.S. Cl. ...................................... 362/80; 362/307; 362/328
[58] Field of Search ..................... 362/61, 80, 82, 83, 362/307, 309, 328, 329

[56] References Cited

U.S. PATENT DOCUMENTS

| 4,153,928 | 5/1979 | Speedy | 362/80 |
| 4,329,738 | 5/1982 | Heinz et al. | 362/61 |
| 4,387,920 | 6/1983 | Slaughter et al. | 362/82 |
| 4,459,644 | 7/1984 | Bailly | 362/83 |
| 4,471,411 | 9/1984 | Graham et al. | 362/80 |

Primary Examiner—William A. Cuchlinski, Jr.
Attorney, Agent, or Firm—William A. Schuetz

[57] ABSTRACT

This disclosure provides a left and right tail lamp assembly for an automotive vehicle. Each left and right tail lamp assembly includes a tail lamp means having an outer lens. The tail lamp means, upon being attached to a common rear housing on the vehicle by fasteners, are also caused to be moved forwardly against stops on the housing to seat the same so that adjacent ends of the lenses are flush with each other and such that the lenses are in alignment with adjacent body structure of the vehicle.

5 Claims, 6 Drawing Figures

ADJUSTABLE SEATING ARRANGEMENT FOR A TAIL LAMP ASSEMBLY

The present invention relates to a tail lamp assembly for an automotive vehicle and, more particularly, to an adjustably seatable tail lamp assembly which aligns itself with adjacent body surfaces of the vehicle when assembled thereto.

Certain automotive vehicles have tail lamps which include left and right tail lamp lenses which together extend across the entire rear of the vehicle. For esthetic reasons, it is desireable to have the adjacent ends of the left and right lenses to be in alignment or flush with each other and also have the lenses be aligned with the adjacent body structure of the vehicle.

Accordingly an object of the present invention is to provide a new and improved left and right tail lamp assembly for an automotive vehicle in which the lenses thereof, upon being attached to a rear housing on the vehicle by fasteners, are also caused to be moved forwardly against stops on the housing to seat the same so that the adjacent ends of the lenses are flush with each other and such that the lenses are in alignment with adjacent body structure of the vehicle.

Another object of the present invention is to provide a new and improved tail lamp assembly for an automotive vehicle which has a rear upper housing provided with horizontally spaced compartments for receiving inner housing portions carrying tail lamps and horizontally spaced housing portions for receiving fastener means, and in which the tail lamp assembly includes an outer lens connected to the inner housing and with the latter having upper and lower forwardly projecting flanges provided with vertically aligned apertures, a first spring clip secured to the uppper flange and having a downwardly depending deflectable leg, a nut means secured to the lower flange, and in which the housing carries a second spring clip having a deflectable leg, and wherein the fastener means is insertable through a slot in the housing which is aligned with the apertures in the flanges, engages the legs of the first spring clip, threadably engages the nut means and engages the leg of the second spring clip when being secured to the housing, and in which the legs of the spring clips deflect and cause the inner housing and lens to be moved forwardly of the vehicle and into engagement which stops on the housing whereby the lens is accurately seated or positioned relative to the housing so as to be in alignment with adjacent body surfaces of the vehicle as well as in alignment with an adjacent outer lens.

Yet another object of the present invention is to provide a new and improved tail lamp assembly, as defined in the next preceding object, and wherein the inner housing is snap fittingly secured to the lens.

Yet another object of the present invention is to provide a new and improved tail lamp assembly, as defined in the penultimate object, and wherein the vehicle includes an esthetic cover overlying the top of the vehicle housing which is provided with the apertures aligned with the fastener apertures of the upper housing on the vehicle and wherein the cover includes detachable buttons snap fittingly securred thereto to cover the fasteners and hide the same from view.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
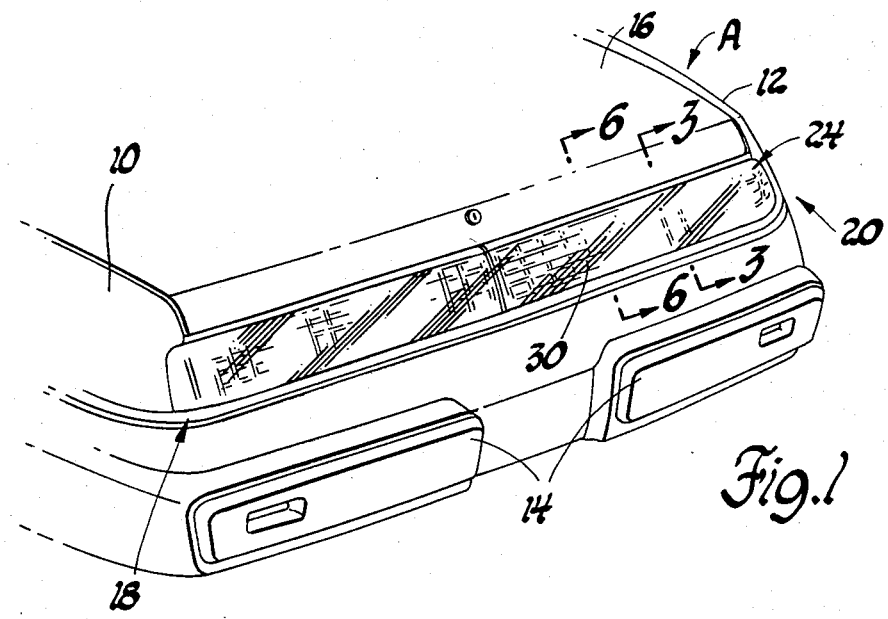
FIG. 1 is a fragmentary perspective view of a rear of an automotive vehicle embodying the novel tail lamp assembly of the present invention.

Referring to FIG. 1 of the drawings, a rear end of an automotive vehicle A is thereshown. The vehicle A includes side and rear body structure including left and right fenders 10 and 12 and rear bumpers 14. The vehicle also includes a trunk or deck lid 16 and left and right tail lamp assemblies 18 and 20.

Since the left and right tail lamp assemblies 18 and 20 are of an identical construction, only the right tail lamp assembly 20 will be described in detail.

The tail lamp assembly 20 comprises, in general, a one piece plastic housing means 22 which extends across the entire rear of the vehicle A and which is suitably bolted or secured to the rear body structure of the vehicle A, a tail lamp means 24 including an inner housing member 26 for supporting and positioning a plurality of tail lamps 28 and an outer one piece molded lens 30, and fastener means 32 for securing the tail lamp means 24 to the housing means 22.

The housing means 22 is molded to the shape shown in the drawings and includes a generally horizontal top wall 40, a generally horizontal bottom wall 42, and a generally vertically extending forward wall 44 which defines the rear wall of a trunk compartment for the vehicle A. The housing means 22 also includes a plurality of horizontally spaced vertically extending walls 48 which alternately define horizontally spaced sockets 50 and housing portions 52.

The housing means 22 supports the tail lamp means 24. The inner housing member 26 of the tail lamp means 24 is of a one piece molded construction and includes a plurality of horizontally spaced generally spherically shaped sockets portions 54. The inner housing member 26 adjacent its end at the center line of the vehicle A has a generally planar portion 55. The socket portions 54 support the lamps 28. The lamps 28 each include a plastic lamp socket 60 detachably secured to the adjacent socket portion 54 in a conventional manner and either a tail lamp or turn signal lamp bulb 62.

The inner housing member 26 at locations between or adjacent the horizontally spaced socket portions 54 and at the planar portion 55 is provided with forwardly extending flanges 64 and 66 adjacent its upper and lower sides, respectively. The flanges 64 and 66 have aligned apertures 64a and 66a for receiving a bolt 70 of the fastener means 32 to enable the tail lamp means 24 to be secured to the housing means 22, and in a manner to be hereinafter more fully described.

The inner housing member 26 and the lens 30 of the tail lamp means 24 are snap fittingly connected together. To this end, the inner housing member 26 has a generally rectangularly shaped outer periphery 72 which is provided with a recess 74 and the lamp lens 30 has a generally rectangularly shaped forwardly extending periphery provided with a bead 76 which is snap fittingly received within the recess 74 of the inner member 26 to connect the inner member 26 and the lens 30 together. The tail lamp lens 30 has a sloping rearward side 78 and is shaped so as to be aligned with the adjacent body structure of the vehicle when attached thereto.

The tail lamp means 24 is secured to the housing means 22 by the fastening means 32. Although only one fastening means 32 is shown in the drawings, it should be noted that three fastening means 32 at spaced locations are employed to attach the tail lamp means 24 to the housing means 22. The fastener means 32 comprises the bolt 70, a first spring clip 80 carried by the flange 64 on the inner housing member 26, a spring nut 82 carried by the lower flange 66 of the inner housing 26 and a second spring clip 84 carried by the housing portion 52 of the housing means 22.

The bolt or screw 70 has a head 70a, a first diameter portion 70b adjacent the head 70a and a second smaller diameter portion 70c which is threaded. The head 70 is slotted so as to enable the bolt to be turned by a screwdriver.

The spring clip or mounting bracket 80 has an upper u-shaped portion 88 to define upper and lower horizontally disposed legs or sides 90 and 92, respectively, which receives the flange 64 on the inner housing member 26. The upper and lower sides 90 and 92 of the u-shaped portion are, when in their free state position, spaced apart a distance which is slightly less than the width or the thickness of the flange 64 so that when the sides 90 and 92 are pushed onto the flange 64, they will spring biasingly grip the flange 64. To facilitate pushing the spring clip 80 onto the flange 64 the ends of the upper side 90 are bent upwardly as indicated at 100. The upper and lower sides 90 and 92 have slots 90a and 92a, respectively, which are aligned with the aperture 64a of the flange 64. The spring clip 80 also includes a pair of spaced apart downwardly extending legs 104 and 106. The downwardly extending legs 104 and 106 extend toward one another and the leg 104 is slotted as indicated at 108. The slot 108 allows the bolt 70 to pass past the leg 104 without engagement therewith and serves to straddle the bolt 70. The legs 104 and 106 freely permit the threaded diameter portion 70c of the bolt 70 pass to therethrough, but leg 106 engages the larger diameter portion 70b of the bolt 70, and for a reason to be hereinafter more fully described.

The spring nut 82 comprises a u-shaped member whose upper and lower sides 110 and 112, respectively, are provided with apertures 110a and 112a which are aligned with the aperature 66a of the flange 66. The upper and lower sides 110 and 112 of the spring nut 82 are, when in their free state position, spaced apart a distance which is slightly less than the thickness of the flange 66 so that when the spring nut is pressed onto the flange 66, it will biasingly retain itself in place. To facilitate pushing the spring nut 82 onto the flange 66, the lower side 112 at its free end 113 is bent away from the side 110.

Figure 3:
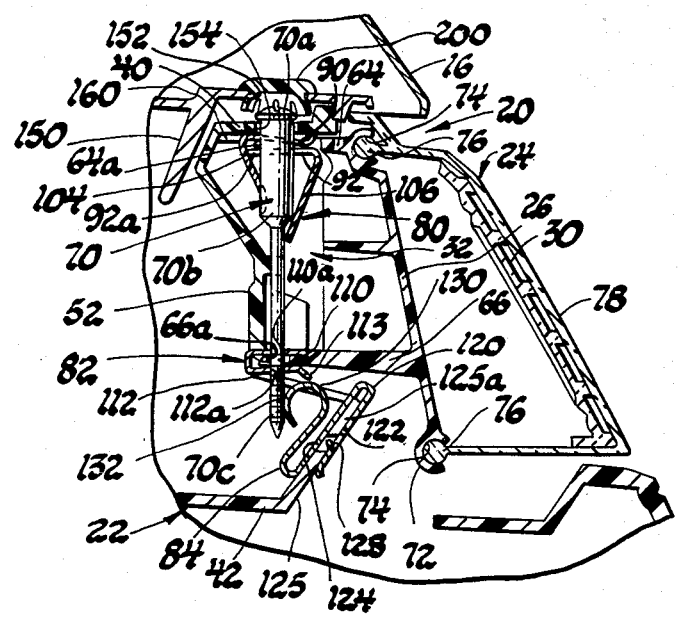
FIG. 3 is a fragmentary sectional view taken along the lines 3—3 of FIG. 1.

The spring or retaining clip 84 includes a u-shaped portion 120 having a pair of spaced sides 122 and 124. The u-shaped portion 120 is adapted to be secured to an upwardly extending flange 125 on the housing portion 52 of the housing means 22. The flange 125 extends upwardly from the bottom wall 42 at approximately a 45 degree angle from a horizontal plane and the legs or sides 122 and 124 of the u-shaped portion 120 are spaced apart a distance which is less than the thickness of the flange 125 so that the legs or sides 122 and 124 of the u-shaped portion 120 engage the flange 125 with a press fit. The side 122 adjacent its free end 122a is bent away from the side 124 so as to facilitate the u-shaped portion 120 being pushed onto the flange 125. In addition, the flange 125 is provided with a recess or aperture 125a which receives a lanced tab 128 on (of) the side 122 to ensure that the clip 84 is retained in place on the flange 125. The retaining clip 84 also includes an s-shaped portion 130 integral with the side 124 to provide a deflectable leg 32 adjacent its free end located directly beneath the spring nut 82 when the clip 84 pushed onto the flange 125 of the housing portion 52, as best shown in FIG. 3.

It should be noted at this point that overlying the housing means 22 is an esthetic coverplate 150 which is provided with oversize elongated apertures 152 which are aligned with the slots 154 in the top of the housing portions 52 of the housing means 22. The slots 154 extend lengthwise of the vehicle.

Figure 2:
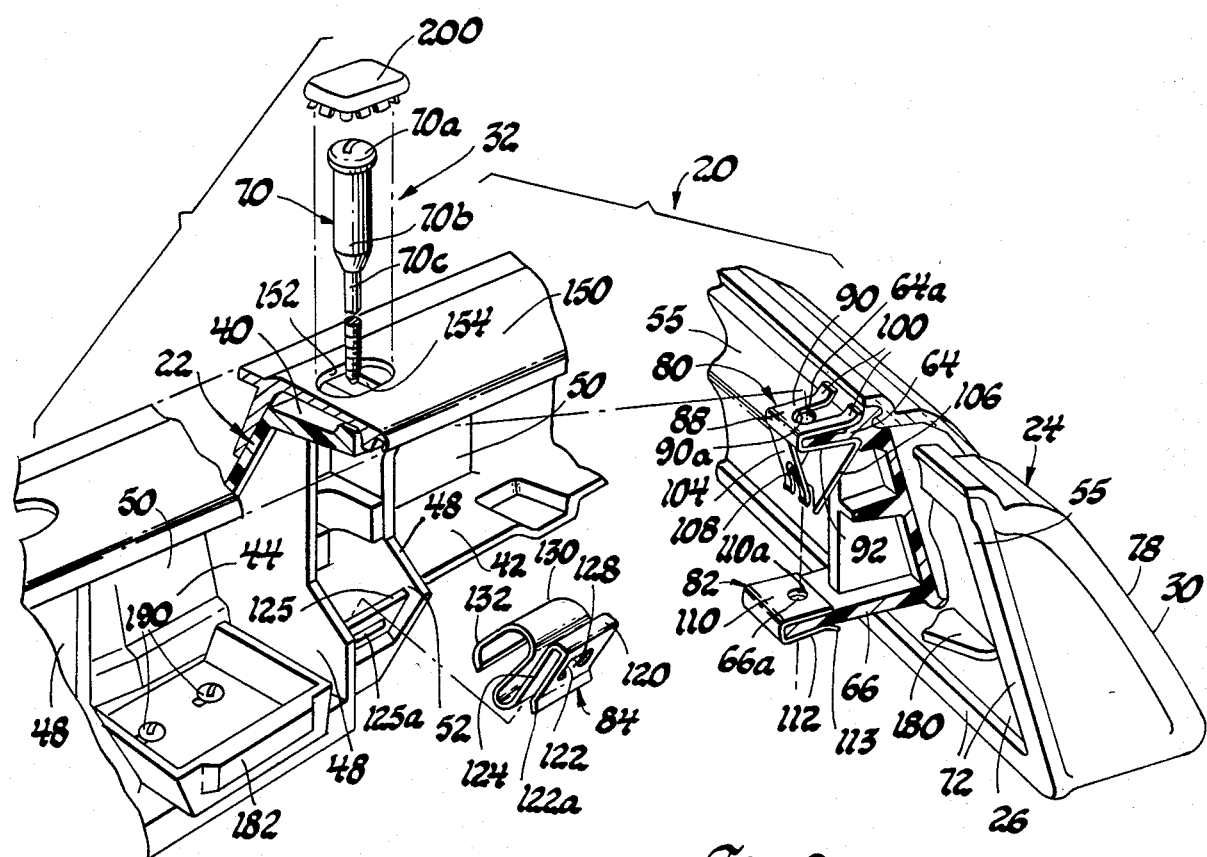
FIG. 2 is a fragmentary exploded view of part of the novel tail lamp assembly of the present invention.
Figure 4:
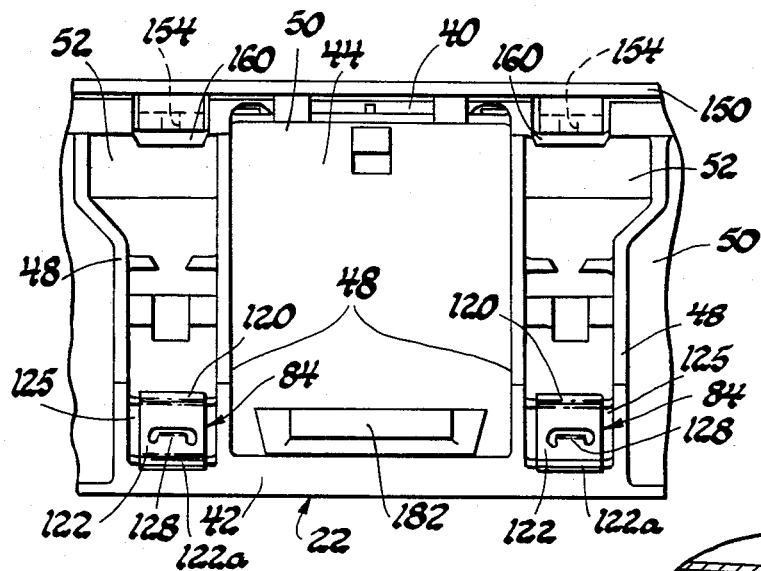
FIG. 4 is a fragmentary plan view of part of the novel tail lamp assembly of the present invention.
Figure 5:
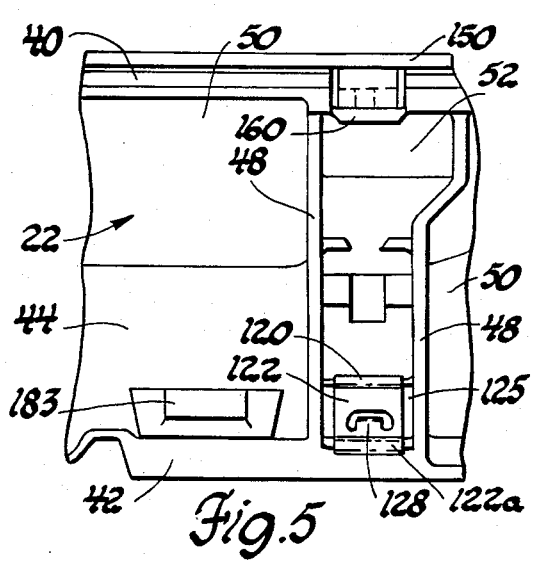
FIG. 5 is a fragmentary plan view of another part of the novel tail lamp assembly of the present invention.
Figure 6:
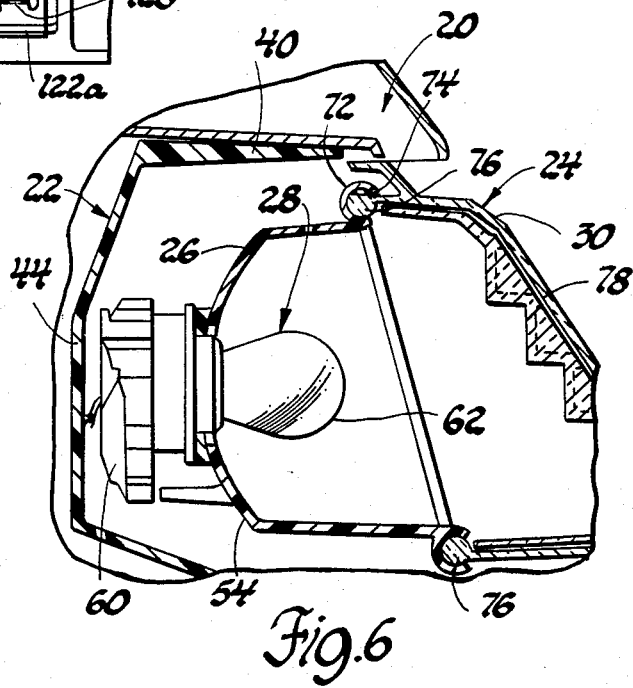
FIG. 6 is a fragmentary sectional view taken along the lines 6—6 of FIG. 1.

The tail lamp means 24 is assembled to the housing means 22 by first assembling all of the tail lamps 28 and turn signal lamps to the socket portions 54 of the inner housing member 26 and then snap fittingly securing the tail lamp lens 30 to the inner housing member 26. Thereafter, the tail lamp means 24 is connected to the housing means 22 by inserting bolts 70 through the aligned apertures 152 and 154 in the coverplate 150 at the top 40 of the housing portions 52 of the housing means 22. As each bolt 70 is further inserted, the small diameter portion 70c thereof passes through the slot 90a, aperture 64a, slot 92a and the depending legs 104, 106 of the spring clip 80 until the threaded portion 70c of the bolt 70 engages the spring nut 82. When this occurs, the bolt 70 is turned to threadably engage the spring nut 82 and pass through the aligned apertures 110a and 112a and 66a of the spring nut 82 and flange 66, respectively. Further turning or tightening down of the bolt 70 causes the large diameter portion 70b to engage the depending leg 106 of the spring clip 80 and the threaded portion 70c to engage the leg 132 of the s-shaped portion 130 of the retaining clip 84. The engagement of the bolt 70 with the depending leg 106 of the spring clip 80 and the s-shaped portion 130 of the spring clip 84 causes the entire tail lamp means 24 to be moved forwardly toward the housing means 22 until the bight of the u-shaped portion 88 of the spring clip 80 carried by the flange 64 engages an upper stop 160 in the housing portion 52 at the top (of) thereof and until a flange 180 on the inner housing member 26 engages a stop 182 adjacent the bottom wall 42 of the housing means 22. The slots 154 in the top wall 40 of the housing means 22 permit the bolt 70 and tail lamp means 20 to be moved forwardly. The stop 160 for each housing portion 52 is integral with the top of the housing means 22 while the lower stops 182 are connected to the bottom 42 of the housing means by a screw and slot connection, as indicated at 190 in FIG. 2, so that they can be adjustably positioned on the bottom wall 42 of the housing means 22. The tail lamp assemblies 18 and 20 at their adjacent ends near the center of the car engage a common stop 182, as shown in FIG. 4. The provision on the common stop ensures that the adjacent ends of the tail lamps 18 and 20 will be flush with each other. As shown in FIG. 5, the other lower stops 183 engage only a flange on the individual tail lamp means 20. The provision of the adjustable stops enables the tail lamp means 20 to be mounted on the housing means 22 so as to be substantially flush with the adjacent exterior of the vehicle as well as with each other.

It should be apparent that when all the bolts 70 are tightened and in place that the provision of the spring clips 80 and 84 with their spring legs 106 and 132 ensures that the tail lamp means 24 is moved forwardly against the housing stops 160 and either 182 or 183 upon being secured thereto. This ensures flushness and proper positioning of the tail lamps 18 and 20 with the adjacent vehicle structure and with each other.

To hide the bolts 70 from view covers 200 are provided which snap fittingly engage the cover 150 when pressed into the aperture 152. This improves the esthetic appearance of that part of the trunk structure and should access be neccessary to unscrew the bolts 70, the covers 120 can be readily pryed loose.

Although the illustrated emodiment hereof has been described in great detail, it should be apparent that certain modifications, changes and adaptations may be made in the illustrated embodiment, and that it is intended to cover all such modifications, changes and adaptations which come within the spirit of the invention.

The embodiments of the invention in which an exclusive property or privilege is claimed are defined as follows:

1. In an automotive vehicle having a tail lamp assembly, said tail lamp assembly comprising:
    a rear housing secured to the vehicle and having a top, a bottom a plurality of horizontally spaced sockets for receiving tail lamps, and plurality of horizontally spaced, vertically extending housing portions for receiving fastener means and upper and lower stops on said housing, said top having a slot therethrough at each of said housing portions,
    a tail lamp means including an outer lens and a plurality of upper and lower forwardly projecting flanges,
    said flanges having vertically aligned apertures therethrough which are also aligned with an adjacent slot in said top,
    first spring clips carried by said upper flanges and having apertures aligned with the aperture in said upper flange and having a deflectable depending leg,
    second spring clips carried by said housing portions at a location beneath an adjacent lower flange of said tail lamp lens and having a deflectable leg located beneath the aperture in said lower flange,
    nut means carried by said lower flanges of said tail lamp means and aligned with the apertures in said lower flanges,
    a plurality of headed fasteners each extending through one of the said slots in said top, one of said first spring clips, a housing portion and threadably engaged with one of said nut means,
    said legs of said first and second spring clips being deflectable by said fasteners and said deflectable legs of said spring clips causing said tail lamp means to be moved toward said housing until upper and lower flanges on said tail lamp means engage said upper and lower stops on said housing when the headed fastener is being secured to said nut means whereby said tail lamp lens is accurately positioned against said housing and aligned with adjacent body surfaces.

2. In an automotive vehicle having a tail lamp assembly, said tail lamp assembly comprising:
    a rear housing secured to the vehicle and having a top, a bottom, a plurality of horizontally spaced sockets for receiving tail lamps, a plurality of horizontally spaced, vertically extending housing portions for receiving fastener means and upper and lower stops on said housing, said top having a slot therethrough at each of said housing portions,
    left and right tail lamp means each including an outer lens and a plurality of upper and lower forwardly projecting flanges,
    said flanges having vertically aligned apertures therethrough which are also aligned with an adjacent slot in said top,
    first spring clips carried by said upper flanges and having apertures aligned with the aperture in said upper flanges and having a pair of spaced depending legs, at least one of said legs being deflectable,
    second spring clips carried by said housing portions at a location beneath an adjacent lower flange of said tail lamp lens and having a deflectable leg located beneath the aperture in said lower flange,
    nut means carried by said lower flanges of said tail lamp means and aligned with the apertures in said lower flanges,
    a plurality of headed fasteners each extending through one of the said slots in said top, one of said first spring clips, a housing portion and threadably engaged with one of said nut means,
    said deflectable legs of said first and second spring clips being deflectable by said fasteners and said deflectable legs of said spring clips causing said tail lamp means to be moved toward said housing until upper and lower flanges on said tail lamp means engage said upper and lower stops on said housing when the headed fastener is being secured to said nut means, said housing having a common lower stop which is engaged by adjacently located ends of both of said left and right tail lamp means whereby the adjacent ends of said left and right tail lamp means will be flush with each other.

3. In an automotive vehicle having a tail lamp assembly, said tail lamp assembly comprising:
    a rear housing means secured to the vehicle and having a top, a bottom, a plurality of horizontally spaced sockets for receiving tail lamps, a plurality of horizontally spaced, vertically extending housing portions for receiving fastener means a plurality of upper stops on said housing and a plurality of lower stops on said housing including a center stop, said top having a slot therethrough at each of said housing portions,
    left and right tail lamp means each including an inner housing for supporting a plurality of tail lamps and an outer lens snap fittingly connected to said inner housing, said inner housing also having upper and lower forwardly projecting flanges at spaced horizontal locations,
    said flanges having vertically aligned apertures therethrough which are also aligned with an adjacent slot in said top, a first spring clip carried by each of said upper flanges and having an aperture aligned with the aperture in said upper flange and having a pair of spaced depending legs, at least one of said legs being deflectable, a second spring clip carried by each of said housing means at a location beneath an adjacent lower flange of said tail lamp means and having a deflectable leg located beneath the aperture in said adjacent lower flange, nut means carried by each of said lower flanges of said tail lamp means and aligned with the apertures in said lower flange, a plurality of headed fasteners having first diameter portion and a second reduced diameter portion which is threaded, said fasteners each extending through one of the said slots in said top, the first spring clip, the housing portion and threadably engaged with one of said nut means, said threaded diameter portion passing freely by said deflectable leg of said first spring clip but said first diameter portion engaging said deflectable leg of said first spring clip when said fastener is being connected to said housing means, said deflectable legs of said first and second spring clips being deflectable by said fasteners and said deflectable legs of said spring clips causing said tail lamp means to be moved toward said housing means until the upper flanges engage said upper stops on said housing means and until third forwardly projecting flanges on said inner housing engage said lower stops on said housing means including said center stop when the headed fastener is being secured to said nut means whereby said left and right tail lamp means are positioned so their adjacent ends are flush with each other and are positioned so as to be aligned with the adjacent body structure of the vehicle.

4. In an automotive vehicle, as defined in claim 3, wherein the upper stops are integral with said housing means and said housing means includes means for adjustably positioning said lower stops relative to said bottom of said housing means.

5. In an automotive vehicle, as defined in claim 1, and wherein said vehicle includes an esthetic cover overlying said top of said housing means, said cover having a plurality of apertures aligned with said slots in the top of said housing means, and a plurality of buttons which are received in said apertures in said cover and snap fittingly connected to said cover whereby said fasteners are hidden from view.

* * * * *